United States Patent [19]
Hawkins

[11] 3,891,308
[45] June 24, 1975

[54] ACOUSTOOPTIC MODULATOR

[75] Inventor: Joseph D. Hawkins, Los Altos, Calif.

[73] Assignee: Liconix, Mountain View, Calif.

[22] Filed: Aug. 5, 1974

[21] Appl. No.: 494,491

[52] U.S. Cl............ 350/161; 331/94.5 M; 332/7.51
[51] Int. Cl............................................... G02f 1/28
[58] Field of Search............... 350/161; 331/94.5 M; 332/7.51

[56] References Cited
UNITED STATES PATENTS

| | | | |
|---|---|---|---|
| 3,509,489 | 4/1970 | Burns et al. | 350/161 X |
| 3,771,856 | 11/1973 | Eschler | 350/161 |
| 3,838,276 | 8/1974 | Cohen | 350/161 X |

Primary Examiner—Ronald L. Wibert
Assistant Examiner—Paul K. Godwin
Attorney, Agent, or Firm—Schatzel & Hamrick

[57] ABSTRACT

An improved acoustooptic modulator for modulating a light beam comprising an acoustooptic body having a first planar surface and a second surface opposite and effectively nonparallel to the first surface, the second surface having scores therein; and an acoustic transducer coupled to the first surface for transmitting an acoustic wave into the body through the first surface for forward propagation to the second surface. The scores serve to randomize the reflection component of the acoustic wave from the second surface so as to prevent the reflection component from destructively combining with the forward propagating wave. This modulator is effective to cause a substantially noise-free turn-on or turn-off of an optical grating formed by the acoustic wave as it propagates through the body. The modulator lends itself to insertion into a laser cavity for use in modulating a laser beam.

15 Claims, 5 Drawing Figures

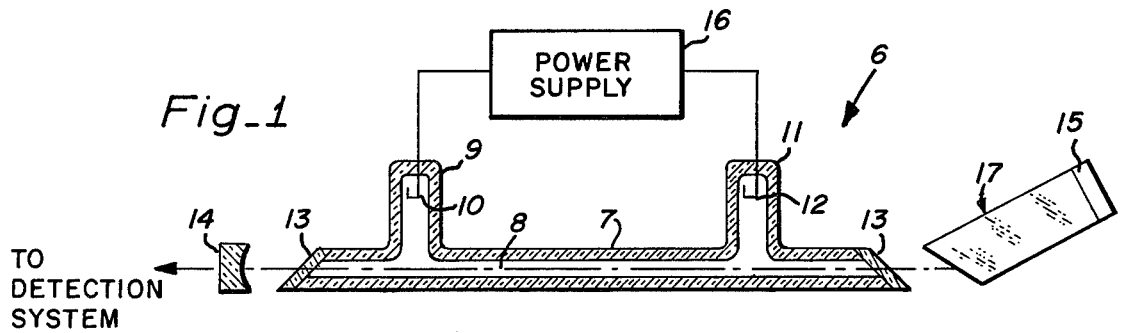
Fig_1
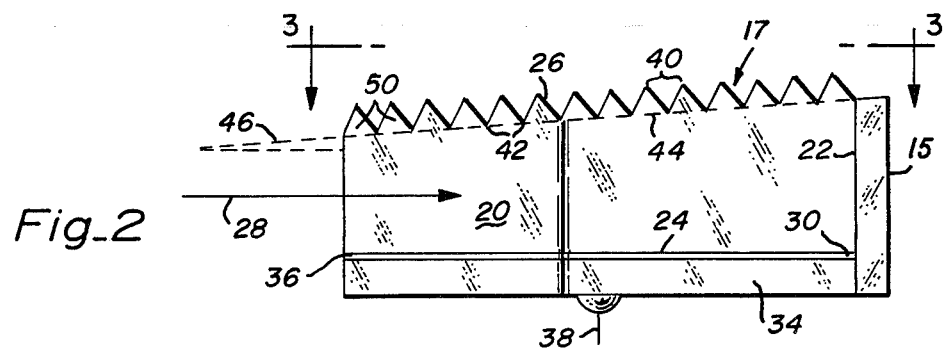
Fig_2
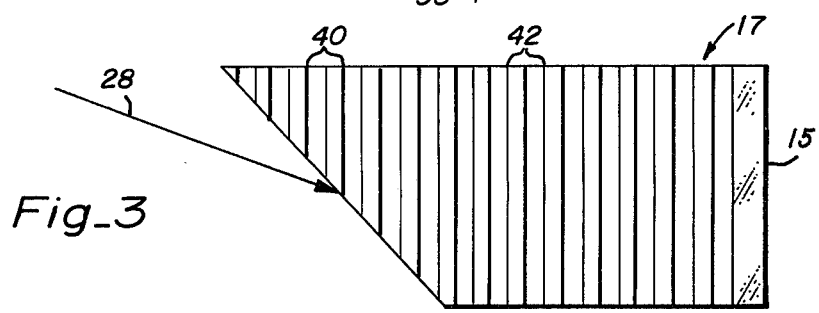
Fig_3
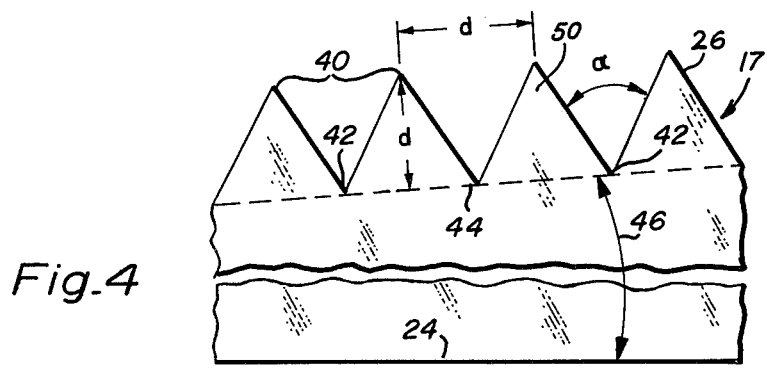
Fig_4
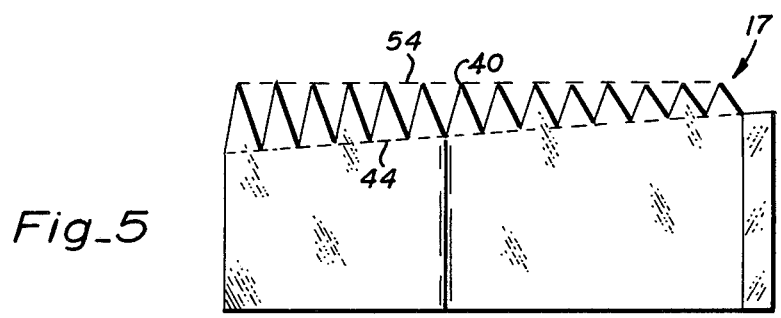
Fig_5

ACOUSTOOPTIC MODULATOR

BACKGROUND OF THE INVENTION

1. Field of the Invention

This invention relates generally to acoustooptic modulators, and more particularly to an acoustic modulator that has a surface beveled and scored for randomizing reflection components of an acoustic wave.

2. Description of the Prior Art

Practical sources of modulated laser light are needed for applications in communications, display and data processing. A variety of ways of modulating laser light external to the laser cavity have been reported. A number of methods of modulating the laser have also been discussed. In addition, it has been suggested that acoustooptic devices for internal modulation of a laser be designed specifically for low-cost commercial application since the devices involve materials and construction techniques well suited for economical production, yet offer efficient operation for a variety of applications.

Historically, it should be remembered that the phenomena of ultrasonic light diffraction has been described in various papers. For example, one article entitled "Unified Approach To Ultrasonic Light Diffraction" by W. R. Klein and Bill D. Cook, IEEE Transactions on Sonics and Ultrasonics, volume SU-14, No. 3, pgs. 123–134, July 1967 describes the diffraction of light from plane progressive sinnusoidal ultrasonic waves using an analysis technique that is based on the investigation of partial waves. This article indicates that a parameter proportional to the product of the square of the ultrasonic frequency and the interaction length of the sound field describes the geometrical properties of the diffraction process.

The state of the prior art as to acoustooptic modulators is exemplified in U.S. Pat. No. 3,247,386 by Viking and U.S. Pat. No. 3,389,348 by DeMaria, and in an article entitled "Simple Acoustic Grating Modulators" by J. M. Hammer and D. J. Channin, Applied Optics, volume 11, No. 10, pgs. 2203–2209, October 1972. This article briefly reviews the theoretical aspects of acoustooptic diffraction, the modulation of a laser by the insertion of a diffracting element in the laser cavity, and modulation bandwidth restrictions. In addition, experimental results on devices made of fused quartz and several glasses of high acoustooptic performance are presented. However, most prior art acoustooptic modulators are plagued by noise problems, especially when they are used to turn on an optical grating formed by an acoustic wave as it propagates through the modulator body.

SUMMARY OF THE PRESENT INVENTION

It is therefore an object of the present invention to provide an acoustooptic modulator which prevents reflection components of an acoustic wave from destructively combining with the forward propagation component so as to minimize noise.

Another object of the present invention is to provide an acoustooptic modulator which is relatively simple to fabricate.

Still another object of the present invention is to provide an acoustooptic modulator which allows the substantially noise free turn on of an optical grating.

Briefly, the present invention is directed toward an acoustooptic modulator for modulating a light beam. The modulator comprises an acoustooptic body having a first surface which is planar and arranged substantially parallel to the direction of the light beam; a second surface which is corrugated so as to define a plurality of alternating crests and troughs, the troughs lying in a first plane which is disposed opposite to and at a small angle relative to the first surface; and an acoustic transducer coupled to the first surface for transmitting an acoustic wave into the body through the first surface for forward propagation to the second surface. The second surface serves to randomize the reflection component of the acoustic wavefront so as to prevent the reflection component from destructively interferring with the forward propagating wave. Accordingly, the turn on of an optical grating formed by the acoustic wavefront as it propagates through the body is substantially noise free. Preferably, the second surface resembles a sequence of triangles in the cross-section having apexes that are coplanar and whose envelope is at a 5° angle to the first surface.

An advantage of the present invention is that the second surface serves to randomize the reflection components of the acoustic wave so as to prevent the components from destructively combining with the forward propagating wave.

Another advantage of the present invention is that the modulator allows a substantially noise free turn on of an optical grating formed by the acoustic wave.

Still another advantage of the present invention is that the modulator is simply and inexpensively fabricated and is insertable within the laser cavity.

Other objects and advantages of the present invention will be apparent to those skilled in the art after having read the detailed disclosure which makes reference to the several figures of the drawings.

IN THE DRAWING

FIG. 1 is a diagrammatic view of a laser system employing an acoustooptic modulator in accordance with the present invention;

FIG. 2 is a side elevational view of the acoustooptic modulator of FIG. 1;

FIG. 3 is a plan view of the acoustooptic modulator of FIG. 2;

FIG. 4 is an enlarged view of a portion of the acoustooptic modulator of FIG. 2; and FIG. 5 is an alternative embodiment of an acoustooptic modulator of the present invention.

DETAILED DESCRIPTION OF THE PREFERRED EMBODIMENT

Referring now to the drawings and more particularly to FIG. 1 thereof, a laser system employing the acoustooptic modulator of the present invention is illustrated. As shown therein, a laser 6 includes a tubular discharge tube 7, forming a bore 8 therethrough. The tube 7 includes a cathode structure 9 in which a cathode 10 is located and an anode structure 11, in which an anode 12 is located. The tube 7 terminates in a pair of Brewster surfaces 13 and is aligned for lasing operation on a resonator (not shown) between an output mirror 14 and a flat end mirror 15. The tube 7 is filled with a suitable lasing gas. A power supply 16 supplies an appropriate discharge voltage between the anode 12 and the cathode 10. An acoustooptic modulator 17 is disposed in the laser cavity between the tube 7 and the end mirror 15. A detection system (not shown) is connected to the output mirror 14 to sense the light output of the laser 6 in a manner well known to those skilled in the art. In the preferred embodiment the discharge tube 7 is a helium metal vapor discharge tube and the modulator 17 is formed integrally with the end mirror 15 although modifications may be made without departing from the present invention. For example, the surfaces 13 may be cut at any suitable angle, including normal to the bore 8 of the tube 7, providing that suitable antireflection coatings are employed. Also, the end mirror 15 may be formed external to the modulator in which case the modulator must be a double Brewster cell.

Referring now to FIGS. 2 and 3, the acoustooptic modulator 17 is illustrated in side elevation and plan views. The modulator 17 is an acoustooptic body, preferably fused silica, formed into a Littrow prism. The prism includes a Brewster angle surface 20, an end surface 22, a bottom surface 24 and a top surface 26 and is arranged such that the incident light beam, generally designated by the numeral 28, from the discharge tube 7 is perpendicular to the end surface 22. All surfaces except the top surface 26 are planar. The mirror 15 is deposited on the end surfaces 22 and serves to reflect the light beam back into the discharge tube in a direction orthogonal to the acoustic waves. The mirror 15 is preferably a 100% reflecting low-loss dielectric mirror. Alternatively, mirrors having a transmission characteristic may be used when it is desired to pick-off some of the laser energy contained in the light beam.

As used in this specification, the words top and bottom and other words of similar import are used for convenience to describe the acoustooptic modulator in its orientation shown in the drawings. However, it should be recognized that the modulator may be oriented in different positions in accordance with this invention.

A metal, preferably gold, is formed into a thin ground plane 30 on the bottom surface 24, and a piezoelectric transducer 34 is attached through an epoxy bond to the ground plane 30. A pair of conductive leads 36 and 38 are connected to the ground plane 30 and the transducer 34, respectively. The piezoelectric transducer 34 is preferably formed from quartz or PZT although most other piezoelectric transducers may be used as long as they produce the desired acoustic wave for appropriately modulating the light beam 28. Generally, the desired acoustic wave may have a suitable frequency in the range of 5-50MHz.

Referring now to FIGS. 2 and 4, the top surface 26 of the modulator 17 is illustrated. As shown, it is positioned opposite to the surface 24 and is beveled and scored in accordance with this invention. As illustrated in the elevation view of FIG. 4, the surface 26 is corrugated and jagged in appearance so as to define a plurality of alternating crests 40 and troughs 42. Because of the beveling, the troughs 42 lie in a plane, illustrated in dashed lines by the numeral 44, which is disposed at a small acute angle 46 relative to the plane of the surface 24. As is known, the acoustooptic properties of the modulator 17 result from a phase grating, formed by changes in the index of refraction resulting from the acoustic compression wave traveling through the modulator 17. The angle 46 is chosen so that the reflected acoustic wave components do not interact with the light beam 28 as will be subsequently described. The exact angle is a function of the acoustic frequency and may be calculated from the teachings of the aforementioned Klein and Cook article. Angle 46 is generally less than 10° and is preferably 5°. The surface 26 establishes a plurality of scores 50 extending above the plane 44 so as to resemble a sequence of triangles. The crests 40, which correspond to the apexes of the scores 50, lie in a common plane which is preferably parallel to the plane 44. In an alternate embodiment shown in FIG. 5, the crests 40 lie in a plane 54 which is parallel to the bottom surface 24.

The scores 50 have a depth $d$ which corresponds to a distance at least equal to the wavelength of the acoustic wave. It should be noted that the wavelength, $\lambda$, varies with the acoustooptic medium. Preferably, the scores form isosceles triangles having a distance between peaks, $d = 4\lambda$ and a trough angle $\alpha$ which is a right angle. A diamond cutting tool is used to form the scores in the quartz body. Since the trough angle $\alpha$ is a right angle, the life of the cutting tool is extended.

In operation, an alternating signal source is applied between the leads 36 and 38 which causes the acoustic transducer 34 to transmit an acoustic wave into the acoustooptic body. The acoustic wave propagates through the body in a forward propagation mode toward the surface 26, passing through the light beam 28 at 90° incidence. Since the surface 26 is beveled at a predetermined angle, the forward propagating wave components reach the plane 44 at different times. As the acoustic wave continues to propagate it reaches the scores 50 which break up, and serve as scattering centers for, the forward propagating wave. Because of their depth the score 50 produce a plurality of reflection components which are randomized relative to one another. Accordingly, the reflection components are prevented from combining with or destructively interfering with the forward propagating wave. As a result, the light beam 28 is modulated in accordance with the intensity of the acoustic wave with very little distortion. It has been observed that the light beam is a replica of the envelope of the acoustic modulation frequency. Consequently, the substantially noise free turn on of an optical grating formed by the acoustic wave as it propagates through the body is allowed.

From the above, it will be seen that there has been provided an acoustic modulator which fulfills all of the objects and advantages set forth above.

While there has been described what is at present considered to be the preferred embodiments of the invention, it will be understood that various modifications may be made therein, and it is intended to cover in the appended claims all such modifications as fall within the true spirit and scope of the invention.

What is claimed is:

1. An acoustooptic modulator for modulating a light beam comprising:
    an acoustooptic body having a first planar surface and a second surface opposite and effectively nonparallel to said first surface, said second surface having scores therein; and
    an acoustooptic transducer coupled to said first surface for transmitting an acoustic wave into said body through said first surface for propagation to said second surface, said scores randomizing the reflection component of said acoustic wave from said second surface to prevent said reflection component from destructively combining with the forward propagating component of said acoustic wave.

2. An acoustooptic modulator for modulating a light beam as recited in claim 1 wherein said scores have a depth of at least the wavelength of said acoustic wave.

3. An acoustooptic modulator for modulating a light beam as recited in claim 1 wherein said second surface forms an angle of less than 10° relative to said first surface.

4. An acoustooptic modulator for modulating a light beam as recited in claim 3 wherein said angle is approximately 5°.

5. An acoustooptic modulator for modulating a light beam as recited in claim 1 wherein said acoustooptic body is fused silica.

6. An acoustooptic modulator for modulating a light beam as recited in claim 1 wherein said scores have a triangular transverse cross-section.

7. An acoustooptic modulator for modulating a light beam as recited in claim 6 wherein the troughs of each of said scores lie in a plane that is disposed at an angle of about 5° relative to said first surface.

8. An acoustooptic modulator for modulating a light beam as recited in claim 7 wherein said triangular cross-sections are isosceles and wherein the distance between adjacent apexes is 4 times the wavelength of said acoustic wave.

9. An acoustooptic modulator for modulating a light beam as recited in claim 1 wherein said body is a Littrow prism.

10. An acoustooptic modulator for modulating a laser beam, said modulator comprising:
    an acoustooptic body having a first surface which is planar and arranged substantially parallel to the direction of said laser beam and a second surface which is corrugated in appearance so as to define a plurality of alternating crests and troughs, said troughs lying in a first plane which is disposed opposite to and at a small acute angle relative to said first surface; and
    an acoustic transducer coupled to said first surface for transmitting an acoustic wave into said body through said first surface for propagation to said second surface, said second surface randomizing the reflection component of said acoustic wave to prevent said reflection component from destructively interfering with the forward propagating component of said acoustic wave.

11. An acoustooptic modulator for modulating a laser beam as recited in claim 10 whrein said acoustooptic body is fused silica.

12. An acoustooptic modulator for modulating a laser beam as recited in claim 10 wherein said angle between said first surface and said first plane is about 5°.

13. An acoustooptic modulator for modulating a laser beam as recited in claim 10 wherein a cross-section of said second surface resembles a sequence of triangles.

14. An acoustooptic modulator for modulating a laser beam as recited in claim 13 wherein said triangles are isosceles having apexes that correspond to said crests, the distance between adjacent apexes being about 4 times the wavelength of said acoustic wave.

15. An acoustooptic modulator for modulating a laser beam as recited in claim 14 wherein said apexes lie in a second plane that is substantially parallel to said first plane.

* * * * *